Oct. 25, 1949.　　　　　A. M. DAVOCK　　　　　2,485,709
FILM AND SLIDE PROJECTOR MECHANISM HAVING
UNITARY CABINET MEANS AND SCREEN
Filed Nov. 4, 1946　　　　　　　　　　　　　4 Sheets-Sheet 1

INVENTOR.
Alfred M. Davock.
BY
Elmer Jamison Gray
ATTORNEY.

Oct. 25, 1949.　　　　　A. M. DAVOCK　　　　2,485,709
FILM AND SLIDE PROJECTOR MECHANISM HAVING
UNITARY CABINET MEANS AND SCREEN
Filed Nov. 4, 1946　　　　　　　　　　　　4 Sheets-Sheet 2
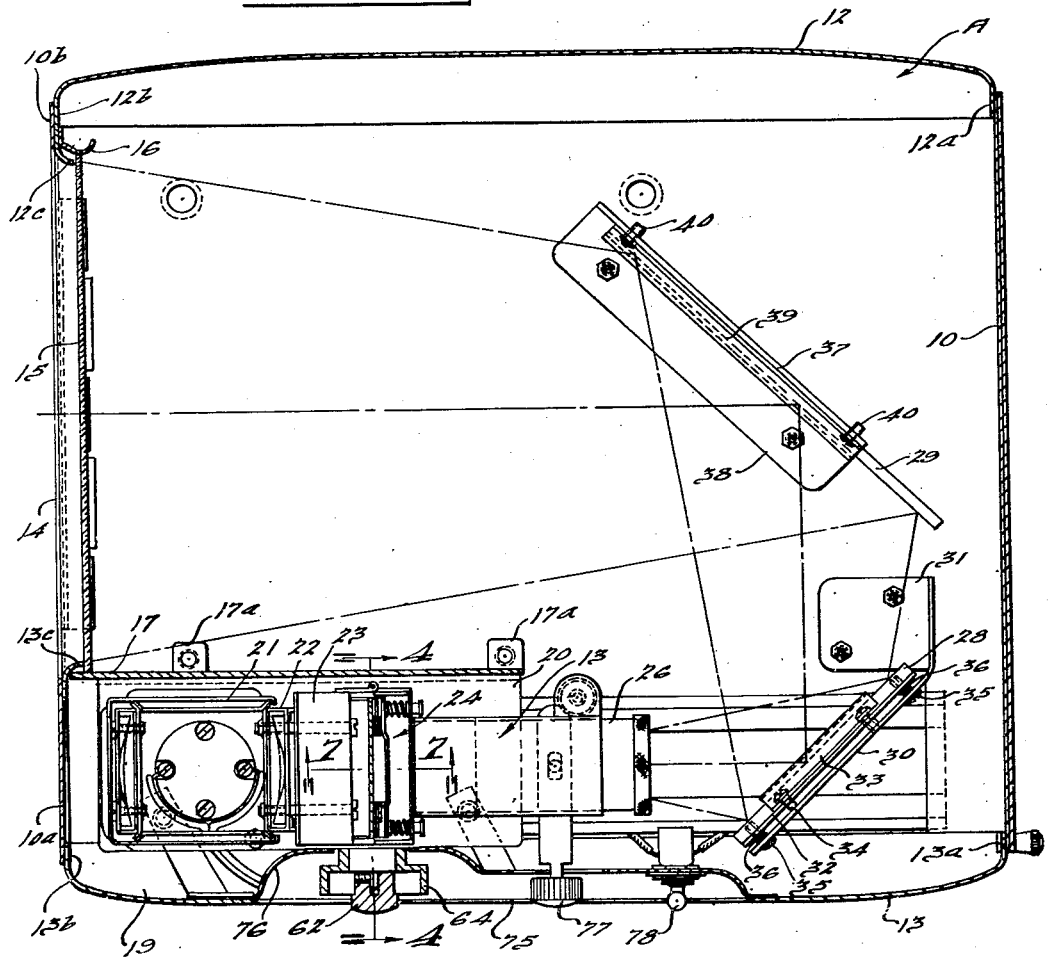
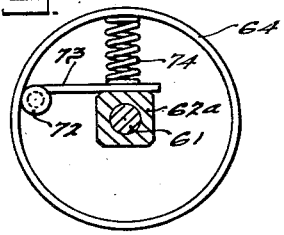
INVENTOR.
Alfred M. Davock
BY
Elmer Jamison Gray
ATTORNEY.

INVENTOR.
Alfred M. Davock
BY
Elmer Jamison Gray
ATTORNEY.

Oct. 25, 1949.  A. M. DAVOCK  2,485,709
FILM AND SLIDE PROJECTOR MECHANISM HAVING
UNITARY CABINET MEANS AND SCREEN
Filed Nov. 4, 1946  4 Sheets-Sheet 4
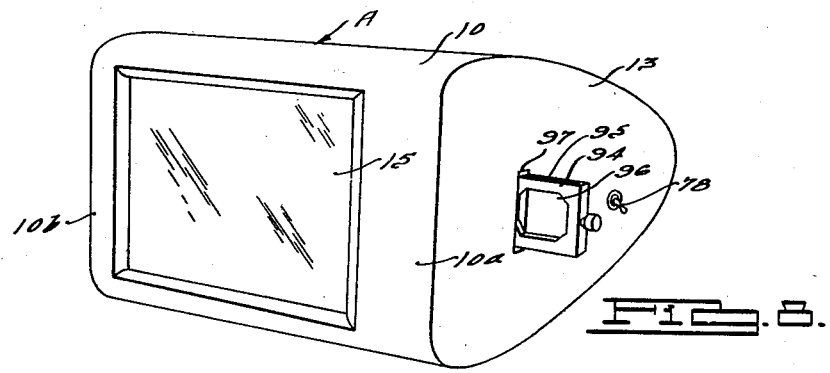
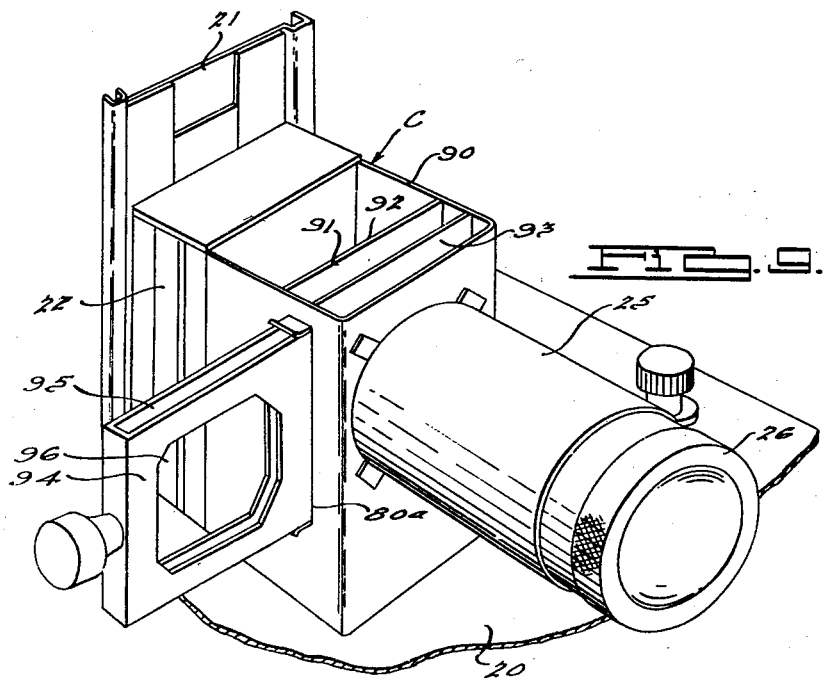
INVENTOR.
Alfred M. Davock.
BY
ATTORNEY.

UNITED STATES PATENT OFFICE 2,485,709

FILM AND SLIDE PROJECTOR MECHANISM HAVING UNITARY CABINET MEANS AND SCREEN

Alfred M. Davock, Birmingham, Mich., assignor to The Jam Handy Organization, Inc., Detroit, Mich., a corporation of Delaware Application November 4, 1946, Serial No. 707,657

9 Claims. (Cl. 88—24)

This invention relates to projector mechanism especially useful for the purpose of displaying slide film, film slides or glass slides on a screen mounted within the projector casing or cabinet. In particular the invention relates to a unitary projector assembly comprising a casing containing the projector proper and carrying at the front of the casing a translucent viewing screen upon which successive pictures are displayed by projecting them onto the inner surface of the screen through mirrors or reflecting surfaces interposed between the projector lens and the screen.

An object of the invention is to provide a projector unit comprising an enclosing casing within one side of which is mounted a projector and in which a translucent viewing screen is mounted within an opening in the front wall of the casing at one side of the projector, the improved construction being such as to provide a compact unit of minimum dimensions wherein the screen is offset to one side in the front wall of the casing thereby enabling the projector to be mounted alongside the screen without, however, interfering with the projection of the pictures thereon.

A further object of the invention is to provide a self-contained portable viewing unit of relatively small and compact construction adapted, for example, to be placed upon a table or desk for viewing pictures, said unit embodying an enclosing casing capable of being attractively designed, such as in streamlined fashion, by reason of the improved arrangement within the casing of the projector mechanism, reflecting mirrors and translucent screen.

Another object of the invention is to provide a film projecting unit comprising a casing within which the projector mechanism is mounted and wherein improved means is provided for enabling the film strip to be loaded quickly and easily into the projector and guided past the light aperture therein.

Still another object of the invention is to provide a film projecting unit in which the casing is provided in the top wall thereof with a film loading slot communicating with a film receiving guide or track extending downwardly past the light aperture or film gate in a projector mounted within the casing, the improved construction permitting the film to be inserted into the slot in the casing and thence readily shifted through the guide into proper position with respect to the light aperture and the teeth of the film advancing sprocket without requiring the casing to be opened in order to manipulate the film or necessitating any manual handling of the film after it has been fed into the film guide or track.

Other objects of this invention will appear in the following description and appended claims, reference being had to the accompanying drawings forming a part of this specification wherein like reference characters designate corresponding parts in the several views.

Fig. 3 is an enlarged horizontal section taken substantially through lines 3—3 of Fig. 2 looking in the direction of the arrows.

Fig. 4 is an enlarged horizontal section taken substantially through lines 4—4 of Fig. 3 looking in the direction of the arrows.

Fig. 5 is a detail section taken substantially through lines 5—5 of Fig. 4 looking in the direction of the arrows.

Fig. 8 is a perspective view of a self-contained projector unit modified for the use therewith of film or glass slides.

Fig. 9 is a fragmentary perspective view of the projector mounted within the casing of the unit shown in Fig. 8.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to Figs. 1 to 7 inclusive of the drawings wherein there is illustrated, by way of example, a portable projector unit constructed in accordance with one embodiment of the present invention, this projector unit comprises a casing or cabinet generally indicated at A which is fabricated with enclosing walls which may be formed of any suitable material such as sheet metal, plastic sheeting or composition board with the walls preferably shaped in streamlined fashion so as to present the desired ornamental and attractive appearance. Thus, in accordance with the invention a portable viewing unit of relatively light, small and compact construction is provided which may be placed upon a table or desk to enable persons sitting nearby to view pictures displayed upon a translucent screen mounted within an opening in the front of the casing.

The casing or cabinet A, in the illustrated embodiment, comprises a main panel 10 bent into generally oblong shape to form top, bottom and front walls with the top and bottom walls converging rearwardly in streamlined fashion, overlapped at 11 at the back of the casing, and secured together in the locality of this overlapping joint, as by means of spot welding. The casing also comprises vertical side panels 12 and 13, see Fig. 3, which are provided respectively with inwardly extending rear flanges 12a and 13a overlapping the side edges of the main panel 10 and secured thereto in any suitable manner. The side panels 12 and 13 are also formed respectively with inwardly extending front flanges 12b and 13b which overlap the side edges of the front vertical wall of the main panel 10, being secured thereto in any suitable manner. With this construction it will be seen that a substantially closed casing is provided which may be fully streamlined or otherwise shaped so as to afford the maximum in attractive appearance.

Figure 1:
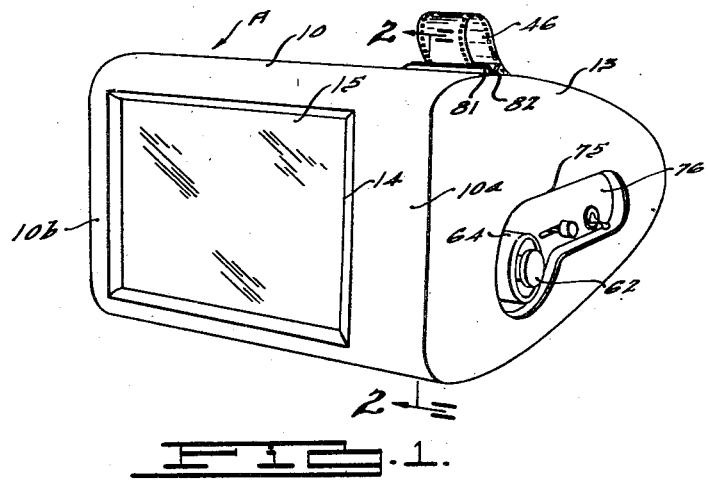
Fig. 1 is a perspective view of a projector viewing unit constructed in accordance with one embodiment of the present invention.

As illustrated particularly in Figs. 1 and 3, the front vertical wall of the main panel 10 of the casing is provided with a front opening 14 which is located off-center with respect to the front wall, as a result of which the front wall has a relatively wide portion 10a at one side of the opening and a relatively narrow portion 10b at the opposite side of the opening. The offset front opening 14 in the casing is entirely closed by means of a translucent viewing screen 15. The flanges 12b and 13b of the side panels, as shown in Fig. 3, are inturned at 12c and 13c, respectively, to provide abutments against which the side edges of the screen 15 rest. Similar abutment flanges 10c and 10d are formed along the upper and lower edges of the opening 14 against which the screen 15 rests, and the screen is removably held in position by means of a number of spring clips 16 secured at intervals to the flanging around the edges of the screen opening 14.

Mounted within the casing A is a vertical partition wall 17 which preferably extends from the bottom to the top of the casing. This partition wall, as shown in Fig. 3, engages the side edge of the screen 15 adjacent the side flanging 13c thereby providing a partition space or compartment 19 opposite the wider portion 10a of the front wall of the casing, said compartment having a width corresponding approximately to the width of the wall portion 10a. The partition 17 is formed along its top and bottom edges with lateral attaching flanges 17a by means of which it is rigidly secured to the top and bottom walls of the casing, as by means of rivets 18.

The partition 17 extends rearwardly from the front of the casing a suitable distance to give the compartment 19 the desired depth for housing the major portion of a suitable projector unit, generally indicated at B. This unit, in the illustrated embodiment, comprises a horizontal base plate 20, see Fig. 2, having a depending flange 20a abutting against the partition 17 and secured thereto at 20b, as by means of bolts and nuts. The projector proper, which is mounted upon and secured to the base plate 20, comprises in general a conventional lamp housing 21 containing an electric lamp bulb which provides a source of light of the desired density, the light rays therefrom passing through a front aperture in the lamp housing and thence through condenser lenses mounted in a casing 22 secured to the lamp housing. In front of the condenser lens assembly is arranged a light shield 23 and a combined film gate and guide structure generally indicated at 24, and later described in detail. Communicating with the film aperture in this structure is a split lens supporting tube 25 within which is telescoped a lens holder 26 which is longitudinally adjustable in the tube 25 and clamped in adjusted position in conventional manner by means of a clamping knob 27.

The light rays issuing from the lens within the lens holder 26 are directed rearwardly, as shown by the dot and dash lines in Fig. 5, against a small angularly positioned mirror or reflecting surface 28. From this surface the light rays are projected angularly and horizontally, as shown by the dot and dash lines in Fig. 5, against a relatively large mirror or reflecting surface 29, and thence the light rays are directed against the rear surface of the translucent screen 15. A picture thus projected against the inner surface of the screen 15 is visible on the outside of the screen due to the translucent material of which the screen is formed.

The light reflecting mirror 28 is supported upon an upright bracket plate 30 which has a horizontal attaching flange 31 bolted to the bottom of the casing. The mirror 28 is mounted upon a mirror base plate 32 and held in position along its upper and lower edges by means of angle retainers 33 secured by means of screws 34 to the base plate 32. The latter is yieldingly mounted upon the bracket 30 by means of adjusting screws 35 carrying small compression springs 36 interposed between the mirror base plate 32 and the bracket plate 30, see Fig. 3.

The mirror 29 is carried by a vertical bracket plate 37 which has a bottom attaching flange 38 bolted to the base of the casing. As in the case of the mirror 28 the upper and lower edges of the mirror 29 are confined by means of retainer clips 39 secured by means of screws 40 to the bracket 37. The position of the mirror 29 with respect to its supporting bracket 37 is preferably fixed whereas the mirror 28 may be adjusted slightly by means of the adjusting screws 35 in order to determine its correct angular position with respect to the mirror 29 so that the image will appear in proper position upon the viewing screen 15.

In the embodiment illustrated in Figs. 1 to 7 inclusive I have illustrated improved film guiding means associated with the projector by means of which the film strip may be readily inserted through a slot in the top of the casing and fed into proper relation to the projector without requiring any manipulation of the film within the casing.

Figures 6, 7:
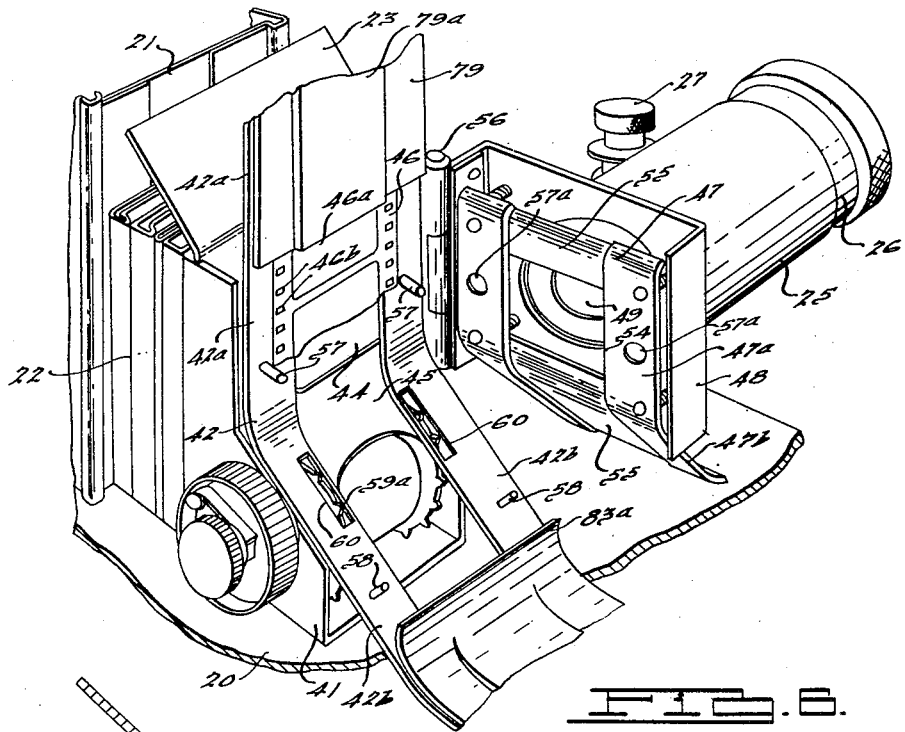
Fig. 6 is a fragmentary perspective view of the projector unit and a portion of the film guide illustrating the swinging film gate in open position.
Fig. 7 is a fragmentary central vertical section taken through the film guide and gate with the latter in closed position.

Rigidly secured to the base plate 20 is a U-shaped bracket 41 having upstanding spaced sides. Arranged between these upright sides of the bracket is fixed pressure plate 42 provided with rearwardly extending attaching flanges 43 bolted to the upright sides of the bracket 41. As shown in Figs. 6 and 7, the fixed pressure plate 42 is angularly formed to provide a vertically extending portion 42a formed centrally thereof with a light aperture 44 and also to provide a lower portion 42b which is inclined downwardly and outwardly. This pressure plate is channelled centrally throughout its length to provide a depressed or relieved portion 45 lying in a plane somewhat rearwardly of the plane of the remaining marginal portions of the pressure plate, the width of the channel or relieved portion corresponding substantially to the width of the picture frames 46a on the slide film strip 46.

Figure 2:
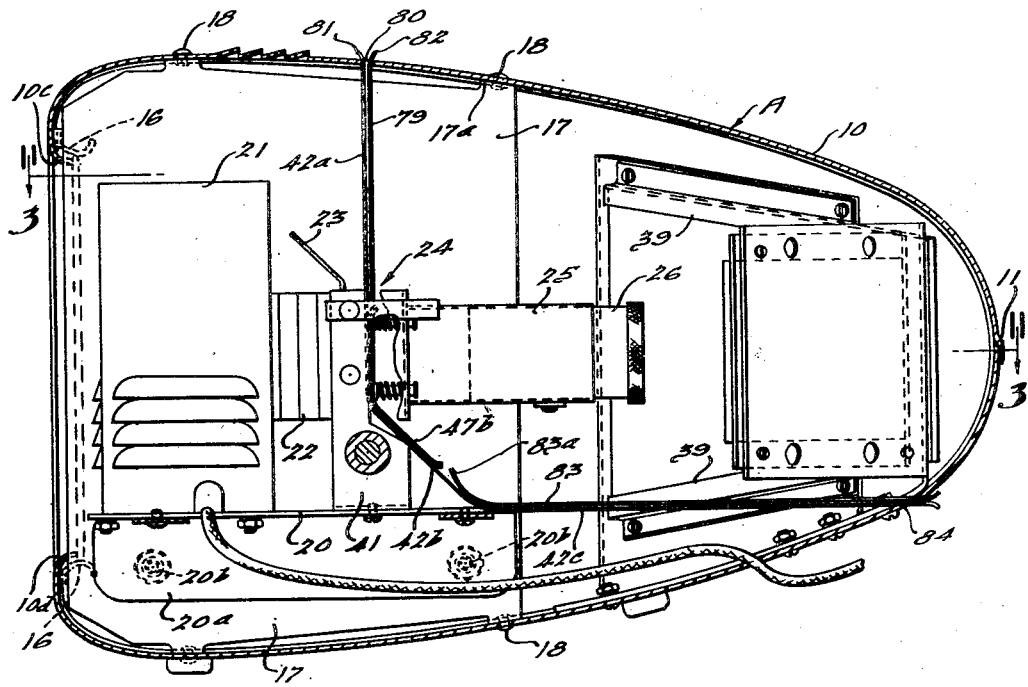
Fig. 2 is an enlarged vertical section taken substantially through lines 2—2 of Fig. 1 looking in the direction of the arrows.

Cooperating with the fixed pressure plate 42 is a yieldable pressure plate 47 which, when the projector is closed, extends contiguously with and parallel to the pressure plate 42 and, hence, is correspondingly shaped throughout its major length. Thus, the front yieldable pressure plate 47 has a vertically extending portion 47a extending parallel with the portion 42a of the fixed pressure plate and also has a downwardly and outwardly inclined portion 47b extending parallel to the portion 42b. The yieldable pressure plate extends between the spaced side flanges of a swinging gate or closure member 48 which is provided centrally thereof with a light aperture 49. It will be understood that when the projector of the illustrated embodiment is mounted, as illustrated in Figs. 2 and 3, within the compartment 19 the projector gate 48 will be held in closed position by a suitable latch (not shown) with the pressure plates in cooperating relation as shown in Figs. 2, 3 and 7.

Secured to the upper end of the yieldable pressure plate 47 are two laterally spaced pins 50 upon which are mounted compression springs 51. Secured to the lower end of the vertical portion 47a of the yieldable pressure plate are a pair of pins 52 upon which are mounted compression springs 53. The pairs of upper and lower spring supporting pins 50 and 52 are guided at their outer ends in holes in the gate member 48 and, hence, the springs are confined under compression between the pressure plate 47 and the gate member. By virtue of this construction it will be seen that the pressure plate 47 is yieldingly mounted on the gate 48 and is capable of limited longitudinal movement fore and aft against the action of the upper and lower springs 51 and 53. The yieldable pressure plate is provided centrally thereof with a light aperture 54 adapted to register with the light apertures 44 and 49 when the projector is closed. The yieldable pressure plate is also formed with a central longitudinal channel 55 extending the full length thereof and corresponding to the channel 45 except reversely formed. Thus, when the pressure plates are in operative relation the channel or relieved portions 45 and 55 register with each other and provide a clearance space through which the picture or picture frame portions 46a of the film pass without contact with either pressure plate. The marginal edge portions, however, of these pressure plates at opposite sides of the channels will engage the edges of the film outside the picture area and this engagement will be of a yielding nature in accordance with the pressure exerted by the springs 51 and 53. The gate member 48 is suitably hinged at 56 to the bracket 41 to permit the same to be swung outwardly, as shown in Fig. 6, when the projector is removed from the cabinet or casing A. The lens supporting tube 25 is rigidly attached to the front side of the gate 48 in line with the light aperture 49 thereof.

For the purpose of positioning and guiding the film 46 through the projector two pairs of guide pins are provided and arranged on the fixed pressure plate 42 so as to engage the edges of the film. A pair of laterally spaced guide pins 57 are mounted on the pressure plate 42 at opposite sides of the light aperture 44 therein. Below the guide pins 57 are arranged two guide pins 58 which also engage the edges of the film strip as it passes through the projector. When the gate 48 is closed the guide pins 57 project into holes 57a in the yieldable pressure plate 47 and the guide pins 58 project into corresponding holes in the lower inclined portion 47b thereof.

The film strip 46 is fed step by step through the projector by means of a sprocket 59 having spaced peripheral teeth 59a meshing in sprocket holes 46b formed along opposite edges of the film. The teeth of the sprocket project through slots 60 in the fixed pressure plate and the sprocket is secured to a cross-shaft 61. Mounted on the outer end of this shaft is a film advance knob 62 having a hub 62a embracing the shaft and secured thereto by a set screw 63. This hub projects into a hollow film framing knob 64 of substantially larger diameter than the knob 62. The film framing knob 64 has a hub 64a rigidly secured by a set screw 65 to a sleeve 66 free on the shaft 61. The sleeve at the outer side of the bracket 41, as shown in Fig. 4, has an annular flange 66a against which the hub 64a abuts. A fiber washer 67 is interposed between this flange and the bracket 41 and a similar fiber washer 68 is mounted on the sleeve 66 at the opposite side of the bracket. Also mounted on the sleeve 66 is a spring washer 69 interposed between flat metal washers 70, one of which engages the fiber washer 68 and the other abuts against a fixed washer 71 on the sleeve 66. The spring washer 69 thus causes the fiber washers 67 and 68 to engage frictionally the bracket 41 and, hence, resist turning of the framing knob 64. As shown in Fig. 5, a flat spring detent 73 is anchored at 72 to the inner wall of the framing knob 64. This detent engages successively the four flat sides of the hub 62a of the film advance knob 62, a compression spring 74 being interposed between the detent and the flanged rim of the framing knob. From the foregoing construction it will be seen that the film advance knob 62 may be turned step by step against the action of the spring detent 73 to shift one picture frame 46a at a time into correct position opposite the light apertures 44 and 54. At each feeding step of the film advance knob the spring detent 73 will engage one flat side of the hub 62a, in the manner shown in Fig. 5, thereby holding the feed sprocket 59 and the film in fixed position while the picture is being displayed on the screen 15. In order to adjust the film so that the picture frames 46a will register correctly with the light apertures 44 and 54, especially after initial loading of the film in the projector, the framing knob 64 may be turned against the resistance offered by the friction washers 67 and 68. When so turned the detent 73 will act as a coupling element to turn the film advance knob 62 and thereby rotate the shaft 61 and the sprocket 59 so as to shift the film longitudinally into correct position with respect to the light apertures.

The side panel 13 of the casing or cabinet A is, in the present embodiment, provided with a suitably shaped aperture or opening 75 which is closed by means of an inwardly recessed or embossed control panel 76 secured around the marginal edges of the opening 75. The hub 64a of the framing knob projects through an aperture in the control panel and, as shown in Fig. 3, the film advance knob 62 and framing knob 64 lie substantially within the embossed or recessed portion of the control panel with the film advance knob projecting but slightly beyond the plane of the panel 13. Also arranged on this panel is a knob 77 connected to any conventional mechanism for adjusting the lens tube 26 longitudinally in order to focus the lens. A light switch 78 is also mounted on the control panel.

Cooperating with the vertical portion 42a of the fixed pressure plate 42 is a film guide or track member 79 which is formed throughout its length with a central channel 79a corresponding to the channel 45 but reversely formed. The guide 79 is mounted in any suitable manner in fixed position, such as by means of a bracket (not shown) secured to the partition wall 17. The vertical guide portion 42a and the guide 79 form cooperating film tracks which extend upwardly from the projector through a slot 80 in the top panel 10 of the casing, see Figs. 1 and 2. The upper terminal ends of these film tracks 42a and 79 have outwardly flared portions 81 and 82 projecting slightly above the upper surface of the panel 10, thereby facilitating insertion of the end of the film 46 through the slot 80 and downwardly between the track or guide members 42a and 79. The lower inclined portion 42b of the fixed pressure plate or guide member 42 has a horizontal extension 42c, see Fig. 2, and cooperating with this extension is a fixed horizontal guide member or film track 83. The superimposed film guides or tracks 42c and 83 are centrally channelled in the same manner as shown at 45 and 55 so as to relieve the picture frames of contact therewith as the film is fed between these guides or tracks. The upper horizontal track 83 terminates adjacent the lower edge of the portion 47b of the yieldable pressure plate and the ends of the film tracks 83 and 42c project outwardly through a slot 84 at the rear end of the bottom wall of the casing.

From the foregoing it will be seen that the portions 42a, 42b and 42c of the fixed pressure plate form with the vertical guide member 79, the yieldable pressure plate 47 and the horizontal guide member 83 substantially a continuous film guide or track from the slot 80 in the top wall of the casing past the light apertures in the projector and thence outwardly through the slot 84 in the rear end of the casing. The film strip may, therefore, be inserted through the slot 80 and shifted downwardly between the track portions 42a and 79 into position between the guide pins 57, 58 to permit the framing knob 64 to be operated so as to engage the teeth of the sprocket 59 with the sprocket holes in the edges of the film. The film strip will pass between the fixed and yieldable pressure plates, during the loading of the film, by reason of the yieldability of the springs 51 and 53.

In order to prevent the film from climbing off the sprocket teeth 59a, which would result in causing the teeth to cut the edges of the sprocket holes in the film, the lower springs 53 acting upon the yieldable pressure plate 47 are made appreciably stronger or stiffer than the upper springs 51. The greater strength of the lower springs, although not great enough to cause excessive pressure on the edges of the film or prevent the passage between the pressure plates of the film strip during the loading operation, is preferably such as to maintain the film in proper meshing relation with the sprocket teeth regardless of the angular pull exerted by the film as it is fed rearwardly and out of the machine.

Referring to Fig. 8 the projector casing or cabinet is constructed mainly the same as in Fig. 1. However, in the embodiment of Figs. 8 and 9 the projector mounted within the compartment 19 is of the type utilizing glass or film slides instead of a film strip. The projector, generally illustrated at C in Fig. 9, is mounted upon the base plate 20 within compartment 19 and comprises a conventional condenser lens assembly 22 attached to the front wall of the light housing 21. In advance of the condenser lens assembly is a casing 90 having a slot 90a in a side wall thereof communicating with a slideway 91 formed between vertical partition walls 92 and 93 provided with registering light apertures. A conventional film or glass slide holder 94 may be shifted into and out of the slideway 91 in order to project successive pictures onto the screen 15 in the same manner as previously described. The holder 94 has the usual slot 95 along the top thereof to receive the film or glass slide and a light aperture 96 registering with the light apertures in the walls 92, 93 and the lens tube 25. The side panel 13 of the casing A has a slot 97 through which the slide holder 94 may be inserted into the projector. It will be understood that the picture on the film or glass slide will be projected upon the inner side of the screen by means of the mirrors 28 and 29 as previously described.

I claim:

1. A projector unit comprising a casing having enclosing walls including upright side walls and a front upright wall, the latter being provided with a generally rectangular opening occupying the major width of the front wall having its center offset with respect to the center of the front wall toward one side wall, a fixed translucent viewing screen arranged in said front wall opening, a vertical partition within said casing extending substantially from said front wall toward the rear of the casing and forming with the adjacent side wall a projector compartment, a projector in said compartment including a light source disposed adjacent the front wall of the compartment and a projector lens in rear thereof for directing light rays toward the rear of the casing, and vertically extending angularly related reflecting surfaces within the casing for projecting light rays from the projector onto the inner surface of said screen, said reflecting surfaces being horizontally opposed with one surface positioned directly in rear of the projector lens and the other surface positioned directly in rear of said screen.

2. A portable projector unit comprising a casing having enclosing walls including top and bottom walls, upright side walls and a front upright wall, the latter having an opening dimensioned to occupy the major area of said front wall and offset laterally therein to provide a relatively narrow front wall portion at one side of the opening and a substantially wider wall portion at the opposite side of the opening, a translucent screen closing said opening, a projector compartment within the casing directly in rear of said narrow wall portion and disposed laterally with respect to the screen, an angularly disposed mirror, means for mounting said mirror in the casing directly in rear of said compartment, a second mirror, means for mounting said second mirror within the casing in rear of the screen and horizontally opposed to said first named mirror, and a projector mounted within said compartment and including a light source adjacent the front wall of the compartment and a projection lens in rear thereof for projecting light rays in a horizontal rearward direction upon said first named mirror and thence to the second mirror and to the screen.

3. A projector unit comprising a casing having enclosing walls, a projector mounted within the casing adjacent one side thereof and having means for directing light rays in a direction toward the rear of the casing, a viewing screen in the front wall of the casing at one side of the projector, angularly related upright reflecting surfaces within the casing for projecting light rays generally horizontally from the projector onto the inner surface of said screen, said reflecting surfaces being horizontally opposed with one surface positioned directly in rear of the projector and the other surface positioned directly in rear of said screen, and guide means for guiding a film strip from the outside through a slot in the top wall of the casing downwardly to the projector and thence rearwardly toward the rear of the casing and through an aperture in a wall thereof.

4. A projector unit comprising a casing having enclosing walls, a vertical partition within the casing extending from the front toward the rear thereof and dividing the space therein into two compartments, a projector mounted in one compartment and including a light source positioned adjacent the front wall thereof and a projector lens in rear of the light source for directing light rays toward the rear of the casing, a translucent screen forming the major front wall of the other compartment, means for reflecting light rays from the projector onto the screen, vertical guide means for guiding a film strip through the projector in a vertical plane extending transversely of the casing, the top wall of the casing having a guide slot aligned with said guide means and through which the film strip is fed downwardly from the outside of the casing, and horizontally extending guide means for guiding the film strip from the projector toward the rear of the casing beneath the projector lens and through an aperture in one of the walls thereof.

5. A projector unit comprising a casing having enclosing walls, a vertical partition within the casing extending from the front toward the rear thereof and dividing the space therein into two compartments, a projector mounted in one compartment and including a light source positioned adjacent the front wall thereof and a projector lens in rear of the light source for directing light rays toward the rear of the casing, a translucent screen forming the major front wall of the other compartment, means for reflecting light rays from the projector onto the screen, vertical guide means for guiding a film strip through the projector in a vertical plane extending transversely of the casing, the top wall of the casing having a guide slot aligned with said guide means and through which the film strip is fed downwardly from the outside of the casing, and horizontally extending guide means for guiding the film strip from the projector toward the rear of the casing beneath the projector lens and through an aperture in one of the walls thereof, said guide means including a fixed film strip guide extending from the top wall of the casing substantially to the projector and a pair of relatively yieldable vertically extending pressure plates substantially aligned with said fixed guide and interposed between the latter and said horizontally extending guide means.

6. A projector unit comprising a casing having enclosing walls, a fixed translucent screen mounted in the front wall of the casing, a projector disposed in the casing laterally with respect to the screen and including a light source and a projector lens in rear thereof for directing light rays from the light source toward the rear wall of the casing, means for reflecting light rays from the projector lens onto the screen and including a reflector arranged in rear of said lens, a film strip guide slot in the top wall of the casing, a film strip guide within the casing extending downwardly from said slot to the projector, and a film strip guide extending rearwardly from the projector below said projector lens, the construction being such that the film strip is fed from above the casing downwardly through said guide slot and first guide to the projector and thence rearwardly through the second guide and through an aperture in a wall of the casing.

7. A portable projector unit comprising a casing having enclosing walls, a fixed viewing screen mounted in the front wall of the casing, a projector disposed in the casing laterally with respect to the screen and including a light source and a projector lens in rear thereof for directing light rays from the light source toward the rear wall of the casing, said projector having a film gate, means for reflecting light rays from the projector lens onto the screen and including a reflector arranged in rear of said lens, a film strip guide slot in the top wall of the casing, guide means for guiding the film strip continuously from said slot to the film gate, and means for guiding the film strip continuously from said gate rearwardly below the projector lens to the rear of the casing and through an aperture in a wall of the casing.

8. A portable projector unit comprising a casing having enclosing walls, a fixed translucent screen mounted in the front wall of the casing, a projector disposed in the casing laterally with respect to the screen and including a light source and a projector lens in rear thereof for directing light rays from the light source toward the rear wall of the casing, said projector having a film gate, means for reflecting light rays from the projector lens onto the screen and including a reflector arranged in rear of said lens, a film strip guide slot in the top wall of the casing, means for guiding the film strip downwardly from said slot through the projector and including a fixed continuous guide extending from the slot to said gate and relatively yieldable guide members communicating with said fixed guide and mounted in the projector, and means for guiding the film strip continuously from said relatively yieldable guide members rearwardly and below the projector lens to an aperture in a wall of the casing and thence exteriorly of the casing.

9. A portable projector unit comprising a casing having enclosing walls including top and bottom walls, upright side walls and a front upright wall, the latter having an opening occupying a predetermined area of said wall, a viewing screen closing said opening, a projector compartment within the casing disposed laterally with respect to said screen, the portion of said front wall occupying the remaining area thereof at one side of the screen defining the front upright wall area of said compartment, an angularly disposed mirror, means for mounting said mirror in the casing directly in rear of said compartment, a second mirror, means for mounting said second mirror within the casing in rear of the screen and horizontally opposed to said first named mirror, and a projector mounted within said compartment and including a light source adjacent the front wall of the compartment and a projection lens in rear thereof for projecting light rays in a horizontal rearward direction upon said first named mirror and thence to the second named mirror and to the screen.

ALFRED M. DAVOCK.

REFERENCES CITED

The following references are of record in the file of this patent:

UNITED STATES PATENTS

| Number | Name | Date |
|---|---|---|
| 1,704,814 | Wellman | Mar. 12, 1929 |
| 1,738,762 | DeVault | Dec. 10, 1929 |
| 1,814,588 | DeVault | July 14, 1931 |
| 2,033,038 | Lee | Mar. 3, 1936 |
| 2,150,992 | Scott | Mar. 21, 1939 |
| 2,272,622 | Rundle | Feb. 10, 1942 |
| 2,285,644 | Bernzott | June 9, 1942 |
| 2,290,287 | Links | July 21, 1942 |
| 2,366,554 | Peck et al. | Jan. 2, 1945 |
| 2,391,879 | Chambers | Jan. 1, 1946 |